United States Patent [19]

Tingskog

[11] 4,334,818
[45] Jun. 15, 1982

[54] FINAL UNLOADING APPARATUS

[75] Inventor: Karl A. L. Tingskog, Helsingborg, Sweden

[73] Assignee: AB Siwertell, Sweden

[21] Appl. No.: 55,651

[22] Filed: Jul. 6, 1979

[30] Foreign Application Priority Data

Jul. 11, 1978 [SE] Sweden .................................. 7807715

[51] Int. Cl.³ ...................... B65G 63/00; B65G 67/00
[52] U.S. Cl. .................................. 414/139; 198/518; 198/668; 414/145; 414/319
[58] Field of Search ............... 414/139, 144, 145, 319, 414/320, 321; 198/518, 608, 668

[56] References Cited

U.S. PATENT DOCUMENTS

| | | | |
|---|---|---|---|
| 3,030,080 | 4/1962 | Hise et al. | 198/518 X |
| 3,828,915 | 8/1974 | Cox et al. | 414/139 X |
| 3,836,019 | 9/1974 | Aralt | 414/139 |
| 3,926,301 | 12/1975 | Herms | 198/509 |
| 4,020,953 | 5/1977 | Eklöf et al. | 414/139 |
| 4,033,449 | 7/1977 | Pradon | 414/145 X |

FOREIGN PATENT DOCUMENTS

| | | |
|---|---|---|
| 702359 | 2/1941 | Fed. Rep. of Germany ...... 198/518 |
| 2100956 | 7/1972 | Fed. Rep. of Germany ...... 414/139 |
| 2143133 | 1/1973 | Fed. Rep. of Germany ...... 414/139 |
| 2210311 | 9/1973 | Fed. Rep. of Germany ...... 414/144 |

Primary Examiner—Leslie J. Paperner
Attorney, Agent, or Firm—Karl W. Flocks; A. Fred Starobin

[57] ABSTRACT

When particulate material reposing on a support or base is to be carried off in an upward direction by means of a vertical conveyor whose lower inlet end portion is vertically and laterally movable, there is a problem involved in the carrying-off of the final, small layer of material on the base and material in recesses and nooks, for example, in the cargo holds of a vessel, which cannot be reached directly by the inlet end portion of the vertical conveyor. This problem has been solved by means of the final unloading apparatus according to the present invention. This apparatus is provided with a sleeve which is adapted to be disposed about the inlet end portion of the vertical conveyor, an elongate feed conveyor which has a discharge end in communication with the interior of the sleeve and is journalled on the sleeve in such a manner that the feed conveyor is pivotal in a plane parallel to the axis of the sleeve, and an elongate collector disposed transversely of the feed conveyor and journalled thereon, the collector being pivotal in a plane transverse to the longitudinal axis of the feed conveyor and supplying material to the inlet end of the feed conveyor.

6 Claims, 5 Drawing Figures

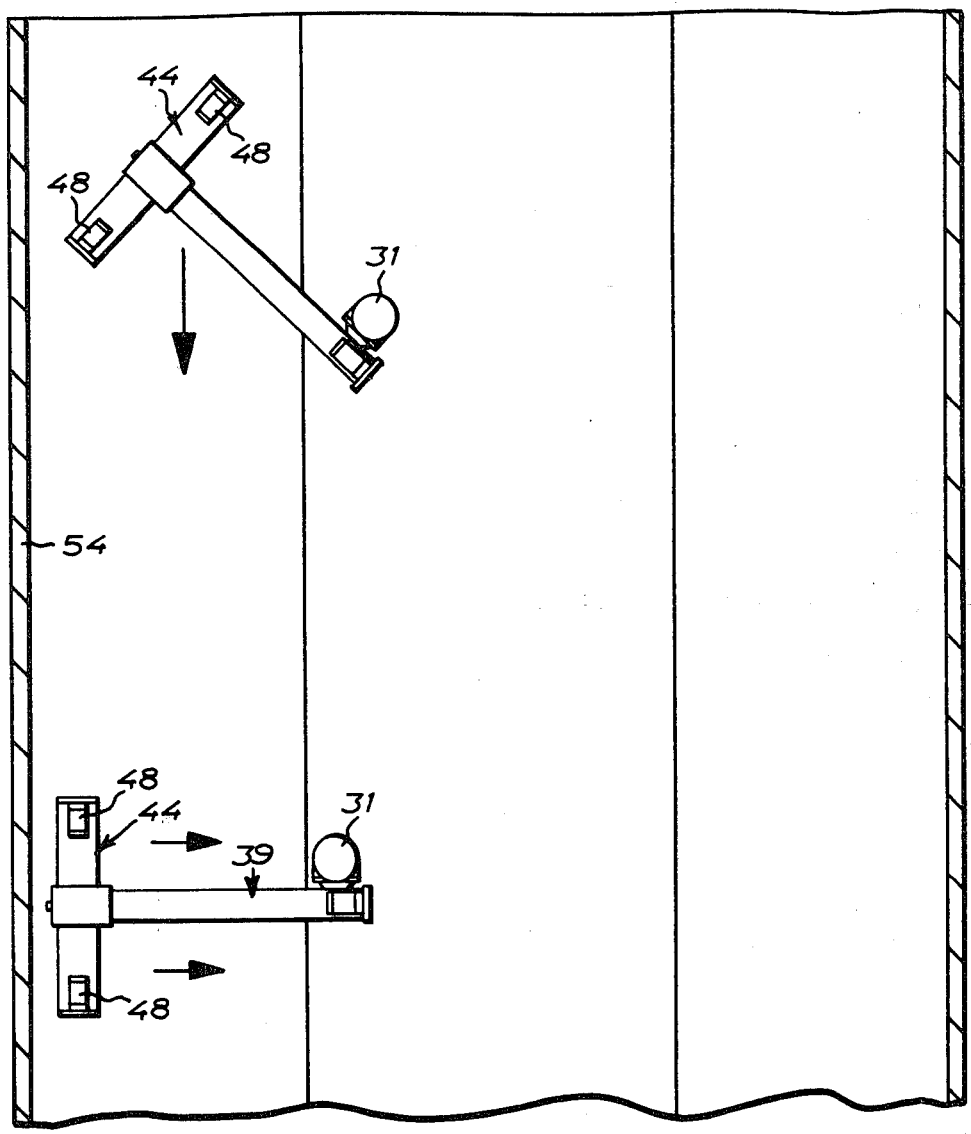

FINAL UNLOADING APPARATUS

In materials handling it is known to carry off particulate material in an upward direction from a support or base therefor by means of a vertical conveyor whose lower inlet end portion is vertically and laterally movable. An ordinary case of such conveyance is the unloading of particulate material from the cargo hold of a vessel. Such a vertical conveyor is shown in, for example, Swedish Pat. No. 390,157.

In such carrying-off operations by means of a vertical conveyor of the above-disclosed type, there is a problem involved in carrying off the final small layer of material on the base and material in nooks and recesses in, for example the cargo hold of a vessel, which cannot be reached directly by the inlet end portion of the vertical conveyor.

This problem has been solved in a simple and effective manner by means of the present invention. Thus, the present invention relates to a final unloading apparatus which is connectable to the lower inlet end portion of a vertical conveyor of the above type and for the above-disclosed carrying-off operation.

According to the invention, the final unloading apparatus is characterised by a sleeve arranged to be mounted about the inlet end portion of the vertical conveyor, an elongate feed conveyor whose discharge end is in communication wih the interior of the sleeve and is journalled on the sleeve in such a manner that the feed conveyor is pivotal in a plane approximately parallel to the longitudinal axis of the sleeve, and an elongate collector disposed transversely of the longitudinal direction of the feed conveyor and journalled on the feed conveyor in such a manner that the collector is pivotal in a plane transverse to the longitudinal axis of the feed conveyor, said collector being adapted, when moving transversely of its longitudinal direction, to feed material in its longitudinal direction to the inlet end of the feed conveyor.

The nature of the present invention will be more readily understood from the following brief description of the accompanying drawings, which shown one embodiment, and discussion relating thereto.

In the accompanying drawings:

FIG. 1 schematically illustrates a prior art apparatus for unloading particulate material from the cargo hold of a vessel with the use of a vertical conveyor;

Figure 4:
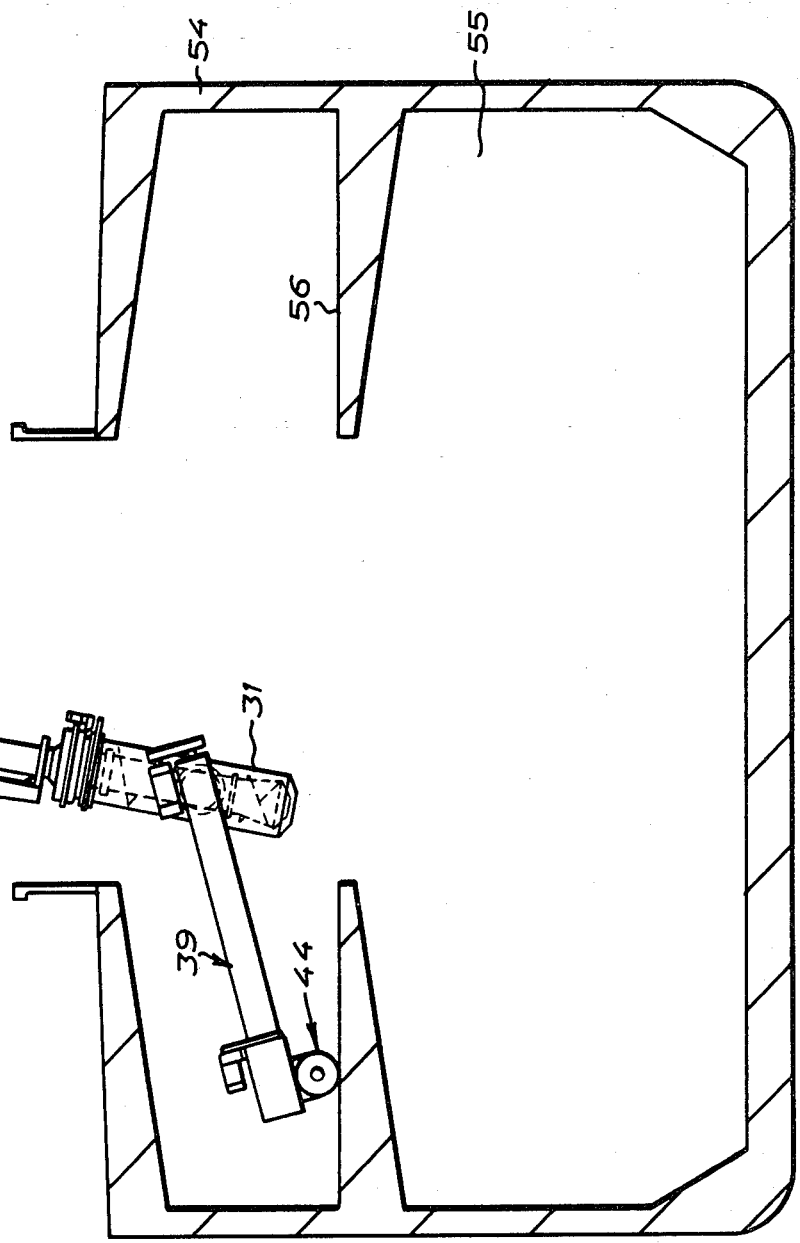

FIGS. 4 and 5 schematically illustrate some positions of operation of the final unloading apparatus according to the invention during the emptying of a vessel cargo hold.

Figure 1:
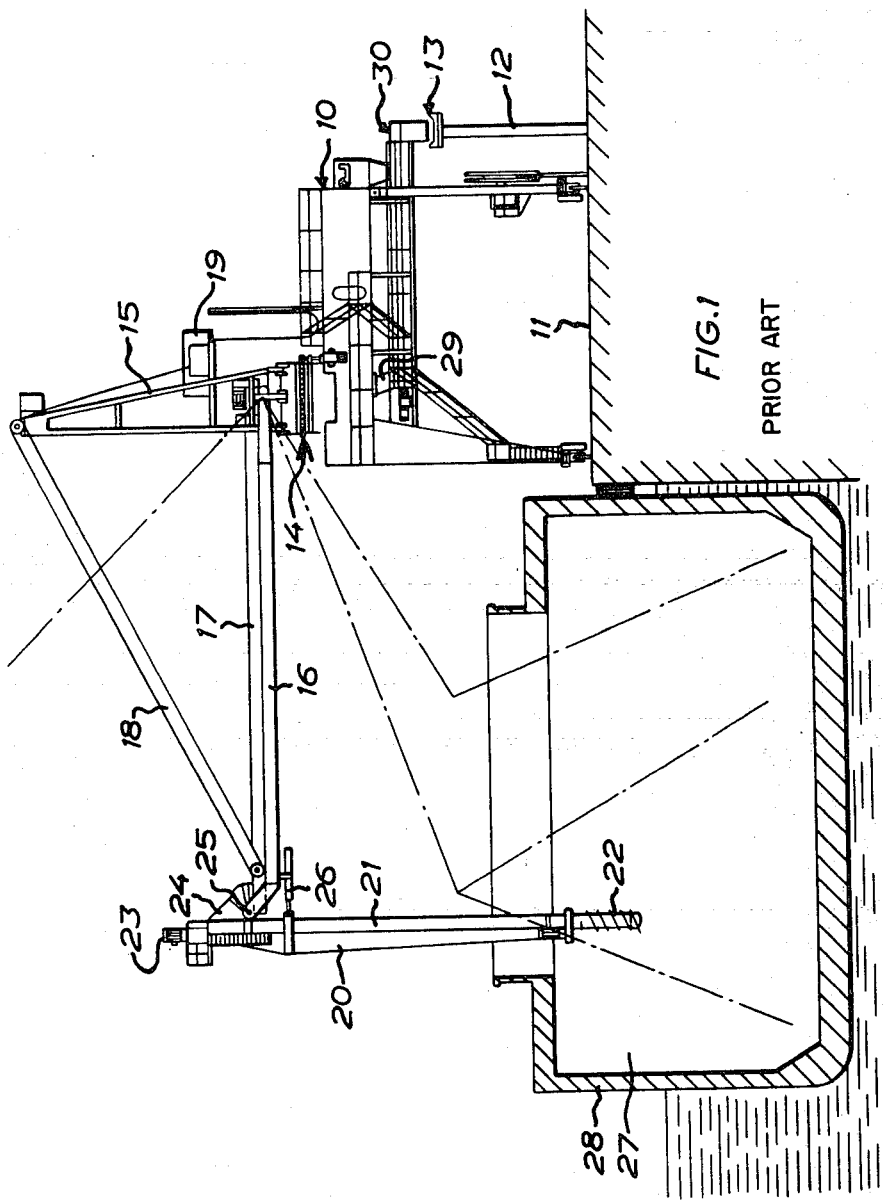
Figure 2:
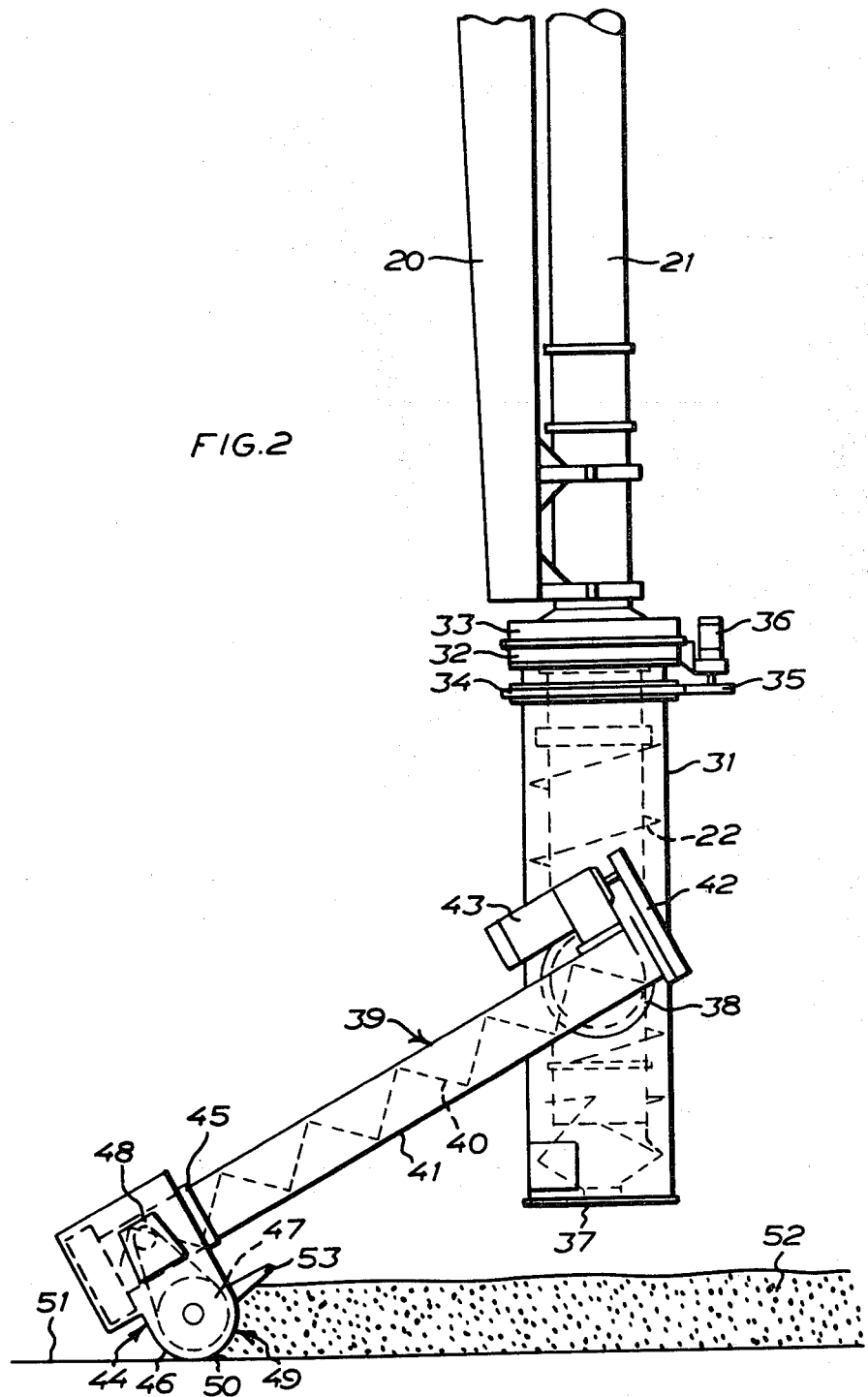
FIG. 2 shows the lower end of the vertical conveyor with a final unloading apparatus according to the invention mounted thereon.
Figure 3:
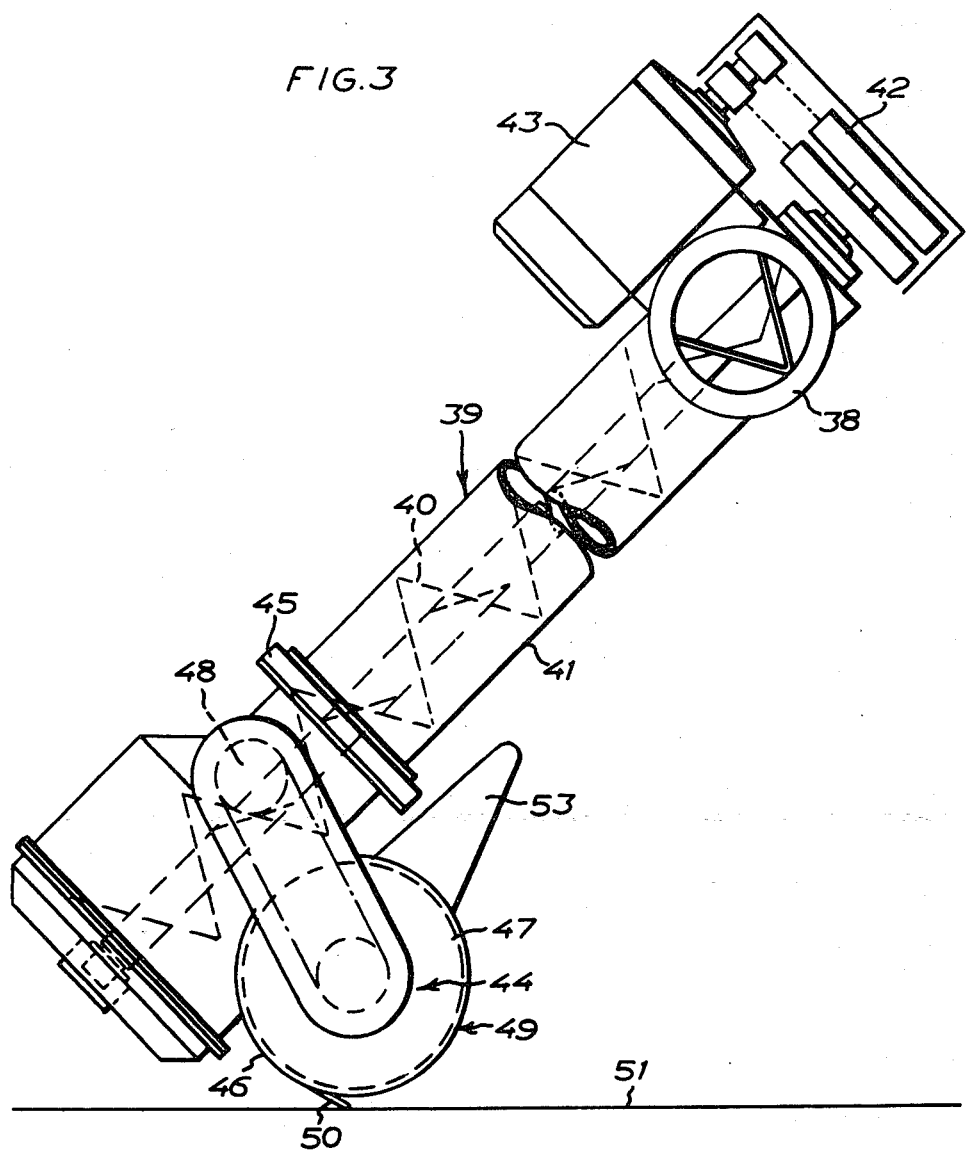
FIG. 3 shows certain parts of the final unloading apparatus.

FIG. 1 schematically illustrates an unloading apparatus, known from Swedish Pat. No. 390,157, with an embodiment of a vertical conveyor, together with which the present invention may be used. The installation has a frame 10 in a form of a gantry which can run along tracks (not shown) on a quay 11. On the quay, there is a conveyor belt 13 which is disposed on columns 12, leads to a warehouse or the like and along which the gantry 10 can travel. On the gantry there is a turntable device 14 for a crane turret 15 which is rotatable by means of a motor. A vertically pivotal jib 16 is mounted at the lower part of the turret. This jib 16 carries a horizontal conveyor 17. The jib 16 and, with it, the conveyor 17, can be set into different angular positions with respect to the horizontal plane by means of a winch 18 whose rope drum and motor 19 are mounted on the turret 15. At its outer end, the jib 16 is pivotally connected to an arm 20 which supports a vertical conveyor 21 which, in the illustrated embodiment, is designed as a screw conveyor and suitably has, at its lower end, a feeding device 22 (for example in accordance with Swedish Pat. No. 322,161). The vertical conveyor 21 has a drive motor 23 mounted on the arm 20 and is connected to the horizontal conveyor 17 by the intermediary of a transfer channel 24. The jib 16 and the arm 20 are pivotally interconnected by means of a joint 25 so as to permit being swung with respect to each other in a plane which is common to them. For regulating the angle between the jib 16 and the arm 20, there is a drive means 26 in the form of a hydraulic piston and cylinder assembly.

By turning the crane turret 15 with respect to the gantry 10 it is, thus, possible to swing the jib 16 in the horizontal direction, and by utilizing the winch 18, it is possible to vary the angular position of the jib 16 with respect to the horizontal plane, the height level of the vertical conveyor 21 being thereby varied. Since the angle between the vertical conveyor 21 and the horizontal conveyor 17 may be varied with the aid of the drive means 26, it is possible to get at a very large proportion of the particulate material which is to be found in the hold 27 in a vessel 28 moored at the quay 11. Some of the conceivable positions of adjustment for the two conveyors 17 and 18 are shown by means of dot-dash lines.

The outlet of the horizontal conveyor 17 is disposed above the turntable assembly 14 in order that the material pass through the hollow turntable assembly to a feeding device 29 of a transverse conveyor 30 which is placed on the gantry 10 for conveying the material to the conveyor belt 13 disposed on the quay.

In the utilizition of an unloading installation of the above-described type, it is difficult to unload the final small material layer on the bottom of the hold 27, and it may also be difficult to get at material in recesses and nooks which cannot be reached directly by the lower inlet end portion of the vertical conveyor 21. Consequently, for final unloading of the hold 27, use is made of a final unloading apparatus according to the present invention. An embodiment of such final unloading apparatus is shown in FIGS. 2–5. When final unloading is to be effected, the final unloading apparatus is mounted on the lower end portion of the vertical conveyor 21.

The final unloading apparatus shown in FIGS. 2–5 has a tubular sleeve 31 which may be passed over the lower inlet end portion of the vertical conveyor 21 around the feeding device 22. The upper end of the sleeve is provided with a ring 32 (FIG. 2) which, by means of a quickcoupler (not shown), may be fixedly connected to a fixed ring 33 on the lower end portion of the vertical conveyor 21. On the ring 32, the sleeve 31 proper is journalled by means of a ball bearing whose outer race, fixedly connected to the sleeve 31, is provided with a gear rim 34. A pinion 35 of a drive motor 36 which is fixedly mounted on the fixed ring 32 engages the gear rim 34. Thus, by means of the motor 36, the sleeve 31 may be turned about its longitudinal axis round the lower inlet end portion of the vertical conveyor 21. The lower end of the sleeve 31 is closed by means of a bottom 37 beneath the lower end of the vertical conveyor 21.

At some distance from the lower end of the sleeve 31, the side wall of the sleeve has a feed opening which is surrounded by a pivot bearing 38, by means of which the discharge end of an elongate feed conveyor 39 is pivotally mounted on the sleeve 31 in such a manner that it may be pivoted in a plane approximately parallel to the longitudinal axis of the sleeve 31. The feed conveyor may be of any given type but is shown, by way of example, as being in the form of a screw conveyor whose screw 40 is surrounded by a tubular casing 41. It is the casing 41 that is connected to the pivot bearing 38 and there has a discharge opening which is in communication with the interior of the sleeve 31 through the pivot bearing. The screw 40 is driven via a transmission 42 by a motor 43 which is fixedly mounted on the casing 41 adjacent the pivot bearing 38.

At the inlet end of the feed conveyor 39, there is arranged an elongate collector 44 which is disposed transversely of the longitudinal direction of the feed conveyor and is journalled by means of a bearing 45 on the casing 41 of the feed conveyor in such a manner that the collector is pivotal in a plane transverse to the longitudinal axis of the feed conveyor 39. Although the collector 44 may protrude in only one direction from the feed conveyor 39, it suitably protrudes, however, in both directions from the inlet end of the feed conveyor 39, as is shown on the drawings. In the illustrated embodiment, the collector is a screw conveyor. This has a substantially tubular casing 46 in which is disposed a conveyor screw 47 of opposite pitch on either side of the inlet end of the feed conveyor 39, such that the conveyor screw 47, on rotation in one direction, feeds material from its ends in a direction towards its central portion where the material is pressed through an opening in the casing 46 into the inlet end of the feed conveyor 39. The conveyor screw 47 is rotated, via transmissions, by two motors 48 mounted at either end of the casing 46. The casing 46 of the collector has an opening 49 extending along the conveyor screw 47, the opening being defined to one side by a scraper edge 50 on the casing (FIG. 3) which is disposed to slide along the support or base 51 on which reposes the particulate material 52 which is to be completely removed. The opening 49 in the casing 46 is defined, to the side opposite the scraper edge 50, by a baffle means 53 disposed on the casing and projecting therefrom.

When final unloading is to be effected of the last small layer of particulate material 52 (FIG. 2) which could not be removed directly by means of the lower inlet end portion of the vertical conveyor 21, the above-described final unloading apparatus is mounted on the lower end of the vertical conveyor 21, this lower end being then set at a suitable height above the base 51 so that the feed conveyor 39 extends obliquely downwardly from the sleeve 31, and the collector 44 rests on the base 51 with its scraper edge 50. Now, all of the conveyors are set in operation, and the lower end of the vertical conveyor 21 is caused to sweep to the right with respect to FIG. 2, the collector 44 being advanced towards the layer of material 52 and gradually supplying material to the feed conveyor 39 which feeds the material into the sleeve 31, from where the vertical conveyor 21 carries the material further in a upward direction. At the end of the sweep, the sleeve 31 is turned through 180° by means of the motor 36, and the lower end of the vertical conveyor 21 is laterally shifted a distance which corresponds approximately to the length of the collector, whereafter a new sweep may be commenced by the lower end of the vertical conveyor 21 for continued removal of material from the base 51. When the final unloading apparatus is moved in the described manner in sweeps along the base, the height of the lower end of the vertical conveyor 21 with the sleeve 31 need not be accurately adjusted for maintaining a constant distance to the base, for variations in this distance will automatically be compensated for within broad limits by pivoting of the feed conveyor 39 about the pivot bearing 38, since the scraper edge 50 of the collector 44 will, under the influence of the weight of the feed conveyor 39 and collector 44, abut against the base 51 at a point spaced from the vertical plane containing the center axis of the pivot bearing 38.

As is apparent from FIGS. 4 and 5, the cargo hold 55 of a vessel 54 being emptied may have a tween deck 56 on which reposes material which was not directly get-at-able by means of the lower inlet end portion of the vertical conveyor 21. However, this material is now accessible by means of the above-described final unloading apparatus. In this instance it is possible to work with said apparatus, for example in sweeps from the side of the vessel and in towards the center, as shown at the bottom of FIG. 5 and in FIG. 4. However, it is also possible to adjust, by means of the motor 36, the longitudinal axis of the collector 44 obliquely with respect to the vessel side 54 and work in sweeps along the vessel side, as shown at the top of FIG. 5. In order to allow for such sweeps obliquely with respect to the longitudinal direction of the collector 44, it must be possible to lock the sleeve 31 in the set pivotal position with respect to the vertical conveyor 21. This is suitably effected in that the motor 36 is provided with a brake which can block the sleeve 31 in the desired pivotal position but release the blocking effect once a predetermined torque has been exceeded.

It is advisable that the inlet opening 49 of the collector be turned towards the sleeve 31 so that the collector be drawn after the sleeve during the movement of the sleeve by means of the vertical conveyor 21 in one direction in the horizontal plane. The scraper edge 50 may, namely, easily glance off obstacles by pivotment of the collector 44 about the longitudinal axis of the feed conveyor 39 and/or by pivotment of the feed conveyor 39 in the vertical direction with respect to the sleeve 31. However, it is also possible to dispose the inlet opening 49 of the collector so that it is turned away from the sleeve 31, in which instance the vertical conveyor 21 will push the collector ahead of itself during its movement in the horizontal plane. However, in such a case, the scraper edge 50 cannot as easily glance off obstacles.

Instead of designing the collector 44 as a conveyor screw, it is possible to make use of cylindrical brushes or bulldozer blades which are adjusted or may be adjusted in such an inclined position with respect to the direction of movement of the collector that the particulate material will, during the movement of the collector, be fed towards the inlet end of the feed conveyor 39.

What I claim and desire to secure by Letters Patent is:

1. A final unloading apparatus connectable to the lower inlet end portion of a vertical conveyor (21) which is disposed to carry off particulate material (52) in an upward direction from a base (51) and whose inlet end portion is vertically and laterally movable, comprising a sleeve (31) arranged to be mounted about the inlet end portion of the vertical conveyor (21), an elongate feed conveyor (39) pivotally connected at its discharge end to said sleeve, connecting said elongate feed conveyor to the interior of said sleeve, a first pivotal means connecting said discharge end of said elongate feed conveyor to said sleeve to allow pivoting of said elongate feed conveyor in a plane approximately parallel to the longitudinal axis of said sleeve about an axis approximately perpendicular to the longitudinal axis of said sleeve, an elongate collector (44) disposed transversely of the longitudinal direction of said elongate feed conveyor and pivotally journalled on said feed conveyor, a second pivotal means connecting said elongate collector to said feed conveyor to allow pivoting of said elongate collector in a plane transverse to the longitudinal axis of said feed conveyor and about an axis substantially coaxial with the longitudinal axis of said feed conveyor, said collector adapted for movement transverse of its longitudinal direction and having means to feed the particulate material in its longitudinal direction to the inlet end of said feed conveyor.

2. The apparatus of claim 1, further characterized by additional pivotal means connecting said sleeve to the inlet portion of the vertical conveyor to allow rotation of said sleeve about the longitudinal axis of the inlet end portion of the vertical conveyor.

3. The apparatus of claim 2, further characterized by said additional pivotal means including a motor (36), said sleeve yieldably retainable in an adjusted pivotal position.

4. The apparatus of claims 1, 2, or 3 wherein said collector (44) is in the form of a screw conveyor (46, 47).

5. The apparatus of claim 2, wherein said collector has a casing (46) surrounding a conveyor screw (47) and having an opening (49) extending along said conveyor screw, said opening being defined to one side by a scraper edge (50) on said casing, said scraper edge being arranged to slide along the base (51).

6. The apparatus of claim 5, wherein said opening (49) in said casing (46) to the side opposite to said scraper edge (50) is defined by a baffle means (53) mounted on said casing and projecting therefrom.

* * * * *